United States Patent Office 3,575,708
Patented Apr. 20, 1971

3,575,708
COATED REGENERATED CELLULOSE
HYDRATE FILM
Wilhelm Brandt and Irmgard Bindrum, Wiesbaden-Biebrich, Germany, assignors to Kalle Aktiengesellschaft, Wiesbaden-Biebrich, Germany
No Drawing. Original application Dec. 1, 1966, Ser. No. 598,171, now Patent No. 3,520,717, dated July 14, 1970. Divided and this application Nov. 3, 1969, Ser. No. 873,630
Int. Cl. C09j 7/02
U.S. Cl. 117—122                        1 Claim

ABSTRACT OF THE DISCLOSURE

This invention relates to a regenerated cellulose hydrate film having a homogeneous coating thereon comprising an adhesive additive selected from the group consisting of a phenoplast and an aminoplast in admixture with a vinylidene chloride copolymer containing about 0.01 to 1 percent by weight, based upon the weight of the copolymer, of at least one accelerator compound selected from the group consisting of tri- and tetrahydroxy benzophenones.

---

This application is a division of copending application Ser. No. 598,171, filed Dec. 1, 1966.

The present invention relates to an aqueous dispersion of vinylidene chloride copolymer, for use in the manufacture of coatings on films of regenerated cellulose hydrates, containing an additive which increases the speed of formation of a strong bond between the coating and the support after application and drying of the dispersion.

Copolymers of vinylidene chloride with acrylic esters and/or unsaturated acids or the anhydrides thereof are good film-forming agents. The films prepared therefrom exhibit good sealability and also are substantially impermeable to gases and water vapor. For this reason, the above-mentioned copolymers of vinylidene chloride are employed for the manufacture of coatings on films of regenerated cellulose hydrates, since the latter do not have the above-mentioned properties to a sufficient degree. Furthermore, it is known to apply the above-mentioned copolymers of vinylidene chloride in the form of aqueous dispersions onto the cellulose hydrate film in order to avoid using inflammable and, in most cases also, expensive organic solvents.

Since films applied in this manner exhibit poor adhesion to the support material, it is necessary, prior to applying the aqueous vinylidene chloride copolymer dispersion, to coat the films of regenerated cellulose hydrates with a suitable adhesive coating.

In order to prevent applying such an additional adhesive coating, it has been suggested to use dispersions containing an adhesive additive. Suitable additives, according to copending application Ser. No. 598,197, filed Dec. 1, 1966, are formaldehyde condensation products, such as phenoplasts and aminoplasts which preferably are condensed in aqueous mixtures with diglycol.

All the hitherto known processes for obtaining coatings from dispersions of copolymers of vinylidene chloride onto films from regenerated cellulose hydrates have the disadvantage that, between the support and the top coating, no strong bond is obtained immediately after coating, but a waiting period is required until maximum adhesion is achieved, in some cases up to several days. In most cases, however, the periods are substantially shorter but usually not so short that it would not be desirable to further reduce them. In the last-mentioned process of applying dispersions containing an adhesive, this disadvantage is particularly noticeable. In order to bring about the desired adhesion in a separate operation, it is necessary to subject the coated and dried film for another brief period to an after-heating.

The present invention provides an additive for aqueous vinylidene chloride copolymer dispersions which substantially accelerates the adhesion process.

Aqueous vinylidene chloride copolymer dispersions are suitable for the manufacture of coatings on films of regenerated cellulose hydrates, if desired containing an adhesive additive, if they have a content of 0.01 to 1 percent by weight, calculated on the weight of the vinylidene chloride copolymer, of at least one compound of the general Formulae I and/or II which is soluble in an aqueous alkali-ammonia mixture, (I) 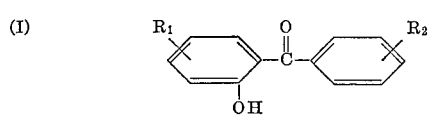

and (II) 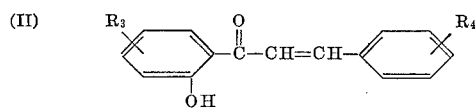

wherein $R_1$, $R_2$, $R_3$, and $R_4$ may be the same or different from each other and represent one or more, same or different from each other, halogens, lower alkyl groups with up to 4 carbon atoms, hydroxyl groups, oxalkyl groups with up to 4 carbon atoms, or hydroxyl groups esterified with naphthoquinone-1,2-diazide sulfonic acid.

Suitable accelerators in the dispersion of the present invention are, inter alia, the following aromatic oxyketones of Formula I: 2-hydroxy-benzophenone, 2,4-dihydroxy-benzophenone, 2 - hydroxy - 4 - methoxy-4'-methyl-benzophenone, 2-hydroxy-4-methoxy-benzophenone, 2-hydroxy-4,4'-dimethoxy-benzophenone as well as tri- and tetrahydroxy-benzophenone such as phlorobenzophenone.

Suitable unsaturated aromatic oxyketones according to Formula II, which also may be called derivatives of chalcones, can be obtained, for example, by condensing 2-hydroxy-acetophenone with aromatic aldehydes. Condensation with benzaldehyde or salicylic aldehyde is preferred.

Particularly good results are obtained when hydroxyl-substituted products of Formulae I and II are esterified with naphthoquinone - (1,2) - diazide sulfonic acids. It should be noted, however, that the hydroxyl group in ortho-position to the keto group must not be esterified, in order not to lose the accelerating effect of the compound. Suitable naphthoquinone - (1,2) - diazide sulfonic esters are those derived from naphthoquinone-(1,2)-diazide-2-sulfonic acid-(5) and from naphthoquinone-(1,2)-diazide-2 sulfonic acid-(4). But also esters of other naphthoquinone - (1,2) - diazide sulfonic acids, such as naphthoquinone - (1,2) - diazide - 1 - sulfonic acid-(5) or naphthoquinone-(1,2)-diazide-1-sulfonic acid-(4), may be used.

The aforementioned accelerating substances must be soluble in an aqueous mixture of alkali and ammonia. Alkali is used at least in an amount such that the substance dissolves. This alkaline solution of accelerator is then stirred into the aqueous dispersion. The accelerator does not influence the stability and storage properties of the vinylidene chloride copolymer dispersion. After adding the accelerator solution, the dispersion should have a pH value above 7.

The concentration of the accelerator within the indicated limits depends upon the solubility thereof. It is possible, for example, to prepare relatively concentrated aqueous solutions, with the addition of alkali, from some di- or trihydroxy-benzophenones either unetherified or etherified only by a short-chain alkyl group at a hydroxyl group, whereas other trihydroxy-benzophenones which are esterified at a hydroxy group by a naphthoquinone-1,2-diazide-2-sulfonic acid, require comparatively large quantities of water and long dissolving times.

The dispersions of the present invention may be coated onto the support and dried in the manner usually employed with the known dispersions, additional steps not being required. The difference from the hitherto known dispersions consists only in that, by the presence of the accelerator, the time required for good bonding is considerably reduced. This is particularly noticeable in the drying period, after which a good bonding is achieved. In extreme cases, the drying time can be reduced to less than $\frac{1}{200}$ of that of the same dispersion without accelerator. The higher the accelerator content of the coating, the higher the maximum adhesion value is and the more rapidly the coating reaches the maximum adhesion value.

The water content of the film upon drying also is of importance for the adhesion to be achieved. With a constant content of accelerator in the vinylidene chloride copolymer coating, the adhesion of the coating is better the lower the water content of the coated and dried film. With a constant water content, equal adhesion properties are achieved within a shorter time with a coating containing an accelerator than with a coating without accelerator.

The accelerators effect an increase in the speed at which adhesion takes place, it being immaterial whether the dispersion contains an adhesive additive or not. Particularly noticeable, however, is the accelerating effect with dispersions containing adhesive additives according to the copending application, supra. In this case, the accelerating effects are especially pronounced so that, in most cases, an after-radiation as recommended in the copending application is not necessary. In some cases, it is more advantageous to subsequently expose the dried accelerator-containing coatings for a short time to an infrared radiator or to a high-frequency field.

The adhesive strength of the copolymer coating on the cellulose hydrate support may be tested in a manner whereby the force required for separating a support and a film coating, after storage in the heat-sealed state for three days in air of 90 percent relative humidity, is determined, or in a manner whereby the coated film is placed in boiling water and the time during which the film remains in the boiling water until the coating just begins to separate from the support is determined.

The invention will be further illustrated by reference to the following specific example:

EXAMPLE (a) Vinylidene chloride copolymer dispersion 594 parts of salt-free water are placed in a polymerization vessel. Therein are dissolved, at first, 3.58 parts of itaconic acid, then 0.54 part of sodium alkyl naphthalene sulfonate and 10.4 parts of a 30 percent aqueous solution of a condensation product of formaldehyde and sodium naphthalene sulfonate. The completeness of dissolution is tested by sampling. Then, 1.57 parts of ammonium persulfate and 0.79 part of sodium pyrosulfite are added and the vessel is closed. The vessel is three times alternatively evacuated and filled with nitrogen with without agitation. Into the evacuated vessel, with agitation, there is then filled a mixture, prepared in a separate vessel, and consisting of 330 parts of vinylidene chloride, 7.4 parts of butyl acrylate, and 14.4 parts of methyl methacrylate. Then, the vessel contents are heated to 45° C. by circulation heating; when this temperature has been reached, the wall of the vessel is cooled. Within 20 minutes, the internal temperature increases to 76° C. and begins to fall again. The reaction pressure reaches a maximum value of 5.5 atmospheres. When the internal temperature has fallen again to 60° C., cooling of the wall is ceased. Polymerization is finished with a circulation heating of 45° C.; this is performed when the pressure has decreased again to atmospheric pressure.

A polymer dispersion having the following characteristics is obtained:

Total solids—38.9% by weight
Viscosity according to Hoeppler at 20° C.—4.0 cp.
Surface tension—68.4 dynes/cm.
Vinylidene chloride content in the copolymer—91.8% by weight.

(b) Aqueous accelerator solutions

These were prepared by dissolving 1 g. of accelerator substance in a mixture of 80 g. of water, 10 g. of 22% by weight aqueous ammonia solution, and 10 g. of 40% by weight potassium hydroxide solution. The individual substances are listed in Tables I to III below.

(c) Solution of a formaldehyde condensation product in water and diglycol

The solution was prepared by adding to 2.12 kg. of diglycol heated to 70° C., 0.25 g. of toluene sulfonic acid and 0.25 g. of ammonium chloride as well as 0.1 kg. of finely ground melamine. The melamine was suspended by vigorous stirring. After about 5 minutes, 0.08 kg. of pure urea was added and, after about another two minutes, 1.5 kg. of 40% by weight formaldehyde solution were poured in at one time while stirring. After 30 seconds, a solution of 0.1 kg. of potassium hydroxide in 100 ml. of water was added and stirring was continued for 1.75 hours at 60 to 65° C. 1000 g. of this solution contain the formaldehyde condensation product from 25 g. of melamine and 20 g. of urea.

The coating dispersions were prepared by mixing the aforementioned solutions and the vinylidene chloride copolymer dispersion. The dispersions always contained, per 100 g. of solid copolymer, 100 g. of condensation product dissolved in the dispersing agent and consisting of 0.075 of melamine and 0.06 g. of urea. The accelerator solution was added to this mixture, if not indicated otherwise, in an amount such that 100 g. of copolymer corresponded to 0.15 g. of accelerator.

This quantity was not exceeded even with mixtures. The individual accelerators are listed in Tables I to III below.

The thus prepared coating dispersions were applied to the surface of a film of regenerated cellulose hydrate by means of a conventional coating machine. The quantity applied always was so selected that the thickness of the dried coating was about 2.5μ. Drying was performed in a drying channel with an air current at 120° C. to 140° C. The duration of drying was regulated by the length of the channel as well as by the feed speed of the film. Insofar as not indicated otherwise in the tables, the duration of drying was eight seconds. In the cases listed in Table II, the dried film was subsequently exposed to infrared radiation. In all cases, the water content of the coated films was between 7 and 9 percent by weight.

The forces required to separate the support and the coating of the thus manufactured coated films were measured after storage for three days, in the sealed state, in an atmosphere of 90 percent relative humidity and the times of adhesion in boiling water were determined. The separation forces were determined with sealed films having sealed seams of 1 cm. width which were sealed with sealing jaws at 130° C. under a pressure of 150 g./cm.² acting for 4 seconds.

Tables I to III below summarize the results of different measurements.

Table I shows examples of reducing the drying time by the action of the accelerating additives of the present invention.

From Table II it can be seen to what extent the addition of accelerators is equivalent to the otherwise required subsequent heating. Table II further shows the influence of the quantity of accelerator on the adhesive properties.

Table III shows the results obtained with different accelerators.

TABLE I

| No. | Accelerator | Drying time in seconds I[1] | II[1] |
|---|---|---|---|
| 1 | | 1,800 | 3,600 |
| 2 | 2,4-dihydroxy-benzophenone | 10 | 15 |
| 3 | Ester of 2,3,4-trihydroxy-benzophenone with naphthoquinone-(1,2)-diazide-(2)-5 sulfonic acid | 30 | 40 |

[1] Necessary drying time of the coated film in seconds, in order to achieve adhesion times in boiling water of 30 minutes (I) and 60 minutes (II).

TABLE II

| No. | Adhesion times in boiling water, in minutes | Coating without accelerator, radiated (necessary duration of infrared radiation,[1] in seconds) | Coating with accelerator, not radiated (necessary accelerator concentration[2] in g./100 g. vinylidene chloride copolymer) |
|---|---|---|---|
| 4 | 30 | 0.5 | 0.10 |
| 5 | 60 | 1.0 | 0.30 |
| 6 | 80 | 2.0 | 0.37 |
| 7 | 90 | 3.0 | 0.42 |

[1] The power absorption of the radiator is 6 watt per cm.² of radiator surface; the distance from the radiator surface to the film is 13 cm.
[2] Accelerator: 2,4-dihydroxy-benzophenone.

TABLE III

| No. | Accelerator | Separating force, in grams 60% relative humidity[1] | 90% relative humidity[2] | Adhesion times in boiling water, in minutes |
|---|---|---|---|---|
| 8 | | 10 | 0 | 2 |
| 9 | 2,4-dihydroxy-benzophenone | 80 | 45 | 60 |
| 10 | 2-hydroxy-4-methoxy-benzophenone | 40 | 20 | 125 |
| 11 | 2,2-dihydroxy-4-n-octoxy-benzophenone | 100 | 60 | 130 |
| 12 | Chalcone from 2-hydroxy-acetophenone and benzaldehyde | 50 | 30 | 140 |

[1] Film stored at 60 percent relative humidity, sealed and then separated immediately.
[2] Film sealed, stored for three days at 90% relative humidity and then separated.

All films were dried for 30 seconds at 120° C.; the water content of the films was 7 percent.

It will be obvious to those skilled in the art that many modifications may be made within the scope of the present invention without departing from the spirit thereof, and the invention includes all such modifications.

What is claimed is:

1. A regenerated cellulose hydrate film having a homogeneous coating thereon comprising an adhesive additive selected from the group consisting of a phenoplast and an aminoplast in admixture with a heat sealable composition consisting essentially of a vinylidene chloride copolymer containing about 0.01 to 1 percent by weight, based upon the weight of the copolymer, of tetrahydroxy-benzophenone as an accelerator compound.

References Cited

UNITED STATES PATENTS

| | | | |
|---|---|---|---|
| 2,384,973 | 9/1945 | Smith | 260—45.95X |
| 2,519,189 | 8/1950 | Houtman | 260—45.95 |
| 2,659,709 | 11/1953 | Daglish et al. | 260—45.95 |
| 2,693,492 | 11/1954 | Hoch | 260—45.95X |
| 2,755,259 | 7/1956 | Dilke et al. | 260—45.95X |
| 2,755,262 | 7/1956 | Dilke et al. | 260—45.9X |
| 2,910,385 | 10/1959 | Berry et al. | 117—145X |
| 3,113,880 | 12/1963 | Hoeschele et al. | 260—45.95X |
| 2,920,978 | 1/1960 | Randall | 117—33.3 |

FOREIGN PATENTS

| | | | |
|---|---|---|---|
| 795,778 | 5/1958 | Great Britain | 117—145 |
| 872,179 | 7/1961 | Great Britain | 117—145 |

MURRAY KATZ, Primary Examiner

M. R. LUSIGNAN, Assistant Examiner

U.S. Cl. X.R.

117—145; 260—29.6, 45.95